(12) United States Patent
Zerouali

(10) Patent No.: US 10,587,036 B2
(45) Date of Patent: Mar. 10, 2020

(54) MULTIBAND ANTENNA DEVICE INTEGRATED WITH A HOUSING SUCH AS A VEHICLE MULTIMEDIA SYSTEM

(71) Applicants: Continental Automotive France, Toulouse (FR); Continental Automotive GmbH, Hannover (DE)

(72) Inventor: Brahim Zerouali, Mainvilliers (FR)

(73) Assignees: Continental Automotive France, Toulouse (FR); Continental Automotive GmbH, Hannover (DE)

( * ) Notice: Subject to any disclaimer, the term of this patent is extended or adjusted under 35 U.S.C. 154(b) by 0 days.

(21) Appl. No.: 16/085,681

(22) PCT Filed: Mar. 17, 2017

(86) PCT No.: PCT/FR2017/050627
§ 371 (c)(1),
(2) Date: Sep. 17, 2018

(87) PCT Pub. No.: WO2017/162965
PCT Pub. Date: Sep. 28, 2017

(65) Prior Publication Data
US 2019/0341681 A1 Nov. 7, 2019

(30) Foreign Application Priority Data
Mar. 22, 2016 (FR) ..................... 16 52458

(51) Int. Cl.
*H01Q 1/32* (2006.01)
*H01Q 1/24* (2006.01)
(Continued)

(52) U.S. Cl.
CPC ............. *H01Q 1/3291* (2013.01); *H01Q 1/24* (2013.01); *H01Q 5/357* (2015.01); *H01Q 13/18* (2013.01); *H04W 4/80* (2018.02)

(58) Field of Classification Search
CPC ...... H01Q 1/3291; H01Q 5/357; H01Q 13/18; H01Q 1/24; H04W 4/80
See application file for complete search history.

(56) References Cited

U.S. PATENT DOCUMENTS

| 2,885,676 | A | 5/1959 | Baldwin | |
| 2015/0188239 | A1* | 7/2015 | Tong | H01Q 1/243 |
| | | | | 343/720 |

FOREIGN PATENT DOCUMENTS

| EP | 2779033 A1 | 9/2014 | |
| WO | 2012160982 A1 | 11/2012 | |
| WO | WO-2012160982 A1 * | 11/2012 | ............. H01Q 1/243 |

OTHER PUBLICATIONS

International Search Report and Written Opinion for International Application No. PCT/FR2017/050627, dated Jun. 1, 2017—7 pages.
(Continued)

*Primary Examiner* — Hai V Tran
*Assistant Examiner* — Michael M Bouizza
(74) *Attorney, Agent, or Firm* — RatnerPrestia

(57) ABSTRACT

A multi-band antenna device intended to be integrated into a metal housing, especially into a multimedia system of an automotive vehicle, including a first, hook-shaped, antenna part linked to a feed intended to be positioned on a printed circuit and to be situated inside the metal housing, a second antenna part having an opening made in a face of the metal housing, the opening exhibiting a hook shape identical to that of the first antenna part, with the same dimensions, and the opening being situated opposite the first antenna part, in a plane parallel to that of said first antenna part, rotated by 90° with respect to said first antenna part.

11 Claims, 3 Drawing Sheets

(51) Int. Cl.
*H01Q 13/18* (2006.01)
*H01Q 5/357* (2015.01)
*H04W 4/80* (2018.01)

(56) References Cited

OTHER PUBLICATIONS

English translation of the Written Opinion for International Application No. PCT/FR2017/050627, dated Jun. 1, 2017, 4 pages.

* cited by examiner

MULTIBAND ANTENNA DEVICE INTEGRATED WITH A HOUSING SUCH AS A VEHICLE MULTIMEDIA SYSTEM

CROSS REFERENCE TO RELATED APPLICATIONS

This application is the U.S. National Phase Application of PCT International Application No. PCT/FR2017/050627, filed Mar. 17, 2017, which claims priority to French Patent Application No. 1652458, filed Mar. 22, 2016, the contents of such applications being incorporated by reference herein.

FIELD OF THE INVENTION

The invention relates to the field of embedded multi-band antennas, especially multi-band antennas integrated with multimedia systems, for example car radios. Such antennas are confined inside metal housings, especially in automotive vehicle cabins.

More precisely, the present invention is targeted at a two-part multi-band antenna device, one part of which relies on exploiting an opening made in a face of a metal housing encasing a multimedia system comprising a multi-band antenna.

BACKGROUND OF THE INVENTION

The use of several antennas integrated with a metal housing, in a multimedia system or an automobile radio for example, is known from the prior art. In particular, numerous automotive vehicles comprise multimedia systems comprising a metal housing encasing several antennas, working in various frequency bands, to allow Bluetooth® communications in the band 2.400 GHz-2.485 GHz and Wifi® communications in the two bands 2.400 GHz-2.485 GHz and 5.00 GHz-5.85 GHz, within the cabin of the vehicle, or else to receive satellite navigation signals in particular.

Thus, it is known from the prior art that antennas are designed to be integrated with metal housings of multimedia systems, themselves integrated with central consoles in automotive vehicle cabins, said antennas being configured to emit in frequency bands such as the band 2.400 GHz-2.485 GHz or else the band 5.00 GHz-5.85 GHz.

In such a context, it is obvious that the mechanical characteristics, such as the shape and the arrangement of the metal housing, have a significant impact on the performance of said antennas.

In the known devices, the performance of such antennas is thus seriously altered with respect to what it would be in a context where said antennas were not integrated into a metal housing and thus-confined.

The mechanical environment of such multi-band antennas indeed gives rise to a strong impact on their performance, reducing in particular their performance in terms of matching, gain, radiation, etc.

Generally, the prior art discloses various methodologies for designing antennas, miniature antennas especially, and in particular exhibiting multi-band emission/reception characteristics.

However, no satisfactory solution is known as regards the optimization of the performance of multi-band antennas intended to be enclosed in metal housings, such as automotive vehicle multimedia systems.

Moreover, the use of a plurality of antennas, in particular of at least two antennas, in such a context, renders yet more complex the analysis aimed at determining the best arrangement to obtain the best compromise in terms of performance of said antennas. In practice, the only known solutions consist in placing such antennas in a housing environment exhibiting fewer metal parts and a maximum of free volume. Nonetheless, metal parts acting as screen still remain and the volume available for the antennas is still limited, so that multi-antenna devices integrated with metal housings in multimedia systems exhibit, in the prior art, degraded performance.

SUMMARY OF THE INVENTION

A need therefore exists for a multi-band antenna device in which the negative impact of the metal housing with which said antenna device is integrated on the performance of said antenna device is reduced.

To this end, an aspect of the present invention proposes a multi-band antenna device, of which a first, hook-shaped, part is installed on a printed circuit, the hook shape being such that the antenna device is quite compact and able to work in various frequency bands by virtue of the dimensioning of the various constituent segments of the hook shape. The antenna device according to an aspect of the invention is moreover devised to be integrated into a metal housing cut out in such a way that an opening made in a face of the housing, opposite the corresponding first hook-shaped antenna part, participates in improving the overall performance of the multi-band antenna device.

To this end, a subject of an aspect of the present invention is a multi-band antenna device intended to be integrated into a metal housing, especially into a multimedia system of an automotive vehicle, comprising:
- a first, hook-shaped, antenna part linked to a feed intended to be positioned on a printed circuit and to be situated inside the metal housing,
- a second antenna part consisting of an opening made in a face of the metal housing, said opening exhibiting a hook shape identical to that of the first antenna part, with the same dimensions, and said opening being situated opposite the first antenna part, in a plane parallel to that of said first antenna part, rotated by 90° with respect to said first antenna part.

Thus, the multi-band antenna device according to an aspect of the invention exploits the presence of the metal housing, confining the printed circuit and the fed antenna part, to improve the performance of the device.

According to a preferred embodiment, said hook shape consists of three coplanar consecutive segments, each segment of the hook shape being orthogonal to each of the contiguous segments.

According to one embodiment, the face of the housing comprising the opening forming the second antenna part and the printed circuit receiving the first antenna part are separated by a distance adjustable as a function of the matching obtained of the antenna device.

According to one embodiment, the multi-band antenna device according to an aspect of the invention is configured to radiate in two frequency bands centered on a first frequency corresponding to a first wavelength $\lambda$ and, respectively, on a second frequency, greater than the first frequency, corresponding to a second wavelength $\lambda'$, the hook shape being formed of three segments, the lengths of said three segments and said first and second wavelengths being configured in such a way that the segments are formed of a first segment, connected to the feed, measuring $\lambda'/4$, of a second segment measuring $\lambda'/8$ and the third segment measuring $\lambda'/6$, the sum of the lengths of the three segments being equal to $\square/4$.

According to a preferred embodiment, the first frequency equals 2.4 GHz and the second frequency equals 5 GHz.

Advantageously, the multi-band antenna device according to an aspect of the invention is configured to allow wireless communication in accordance with the Bluetooth® protocol in the frequency band 2.400 GHz-2.485 GHz and to allow Wifi® communication in the two bands 2.400 GHz-2.485 GHz and 5.00 GHz-5.85 GHz.

Advantageously, the opening is made in a face of the underside of the metal housing in a situation of use.

An aspect of the present invention is also targeted at a multimedia system, such as an automobile radio, intended to be integrated into an automotive vehicle central console, comprising a metal housing exhibiting an underside face intended to be situated toward the bottom once the multimedia system has been integrated with an automotive vehicle central console, said metal housing comprising a powered printed circuit, said housing comprising a multi-band antenna device such as briefly described hereinabove.

BRIEF DESCRIPTION OF THE DRAWINGS

Aspects of the invention will be better understood upon reading the following description, given solely by way of example, and with reference to the appended drawings, in which.

DETAILED DESCRIPTION OF THE PREFERRED EMBODIMENTS

It should be noted that the figures disclose an aspect of the invention in a detailed manner so as to enable the implementation thereof, said figures also being able to serve to better define an aspect of the invention, of course.

An aspect of the invention is presented principally with a view to an integration of the multi-band antenna device into a multimedia system embedded in an automotive vehicle. However, other applications are also targeted by an aspect of the present invention, provided that a multi-band antenna of small dimension is confined in a metal housing.

As was described previously, an aspect of the present invention relates to a multi-band antenna device. In particular, within the framework of an envisaged application, in which a multi-band antenna or a plurality of antennas is integrated with a multimedia system, it is known that such antennas are confined in a multimedia system metal housing. Such a housing comprises a printed circuit comprising numerous slots intended to receive a plurality of electronic components.

Among the components received by the printed circuit are the antennas intended to emit and/or receive in various frequency bands.

The frequency bands 2.400 GHz-2.485 GHz and 5.00 GHz-5.85 GHz are in particular exploited for embedded wireless communication applications in the context of automotive vehicles and these frequency bands are in particular targeted for the implementation of an aspect of the present invention. Other frequency bands can nonetheless be used.

Whereas, according to the prior art, the metal parts of the housing confining the antenna(s) forms only masks attenuating the performance of said antennas, the device according to an aspect of the invention proposes to form an antenna consisting of two parts, namely a first part, received by the printed circuit able to convey a power feed to said first antenna part, and a second part, formed of a suitably adapted cutout, provided in the face of the metal housing opposite said first antenna part.

Figure 1:
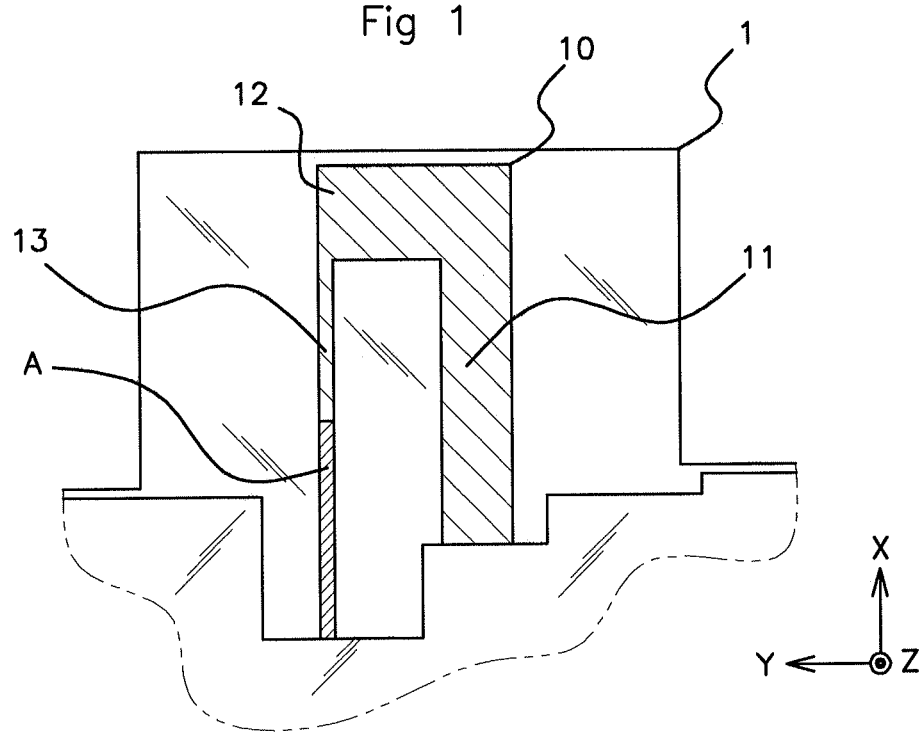
FIG. 1 represents a diagram of an embodiment of the first antenna part, formed of a hook-shaped antenna, connected to a printed circuit, in a multimedia system.

Thus, with reference to FIG. 1, according to an aspect of the invention, the first antenna part 10 is received by the printed circuit 1 and exhibits a hook shape comprising at least two consecutive segments, and preferably three consecutive segments 11, 12, 13, whose respective length is equal to a fraction of a wavelength to be emitted and/or received and, the sum of whose lengths is a fraction of another wavelength to be emitted and/or received. In this instance, each pair of consecutive segments is orthogonal.

It should be noted that, according to one embodiment, the electronic components received by the printed circuit are furthermore arranged to form an electromagnetic loop having a resonance in at least one of the frequency bands in which the device must emit and/or receive.

The power feed A, brought via the printed circuit 1 up to the first antenna part 10, is devised so as to supply the antenna device with the power necessary to emit the desired radiation.

According to one embodiment, the total length of the first antenna part 10, obtained by taking the sum of the lengths of the three consecutive segments 11, 12, 13, is $\lambda/4$, where $\lambda$ is the wavelength corresponding to the frequency 2.4 GHz. According to this embodiment, the first segment 11 measures $\lambda'/4$, the second segment 12 measures $\lambda'/8$ and the third segment 13 measures $\lambda'/6$ of 5 GHz, where $\lambda'$ is the wavelength corresponding to the frequency 5 GHz.

Figure 2:
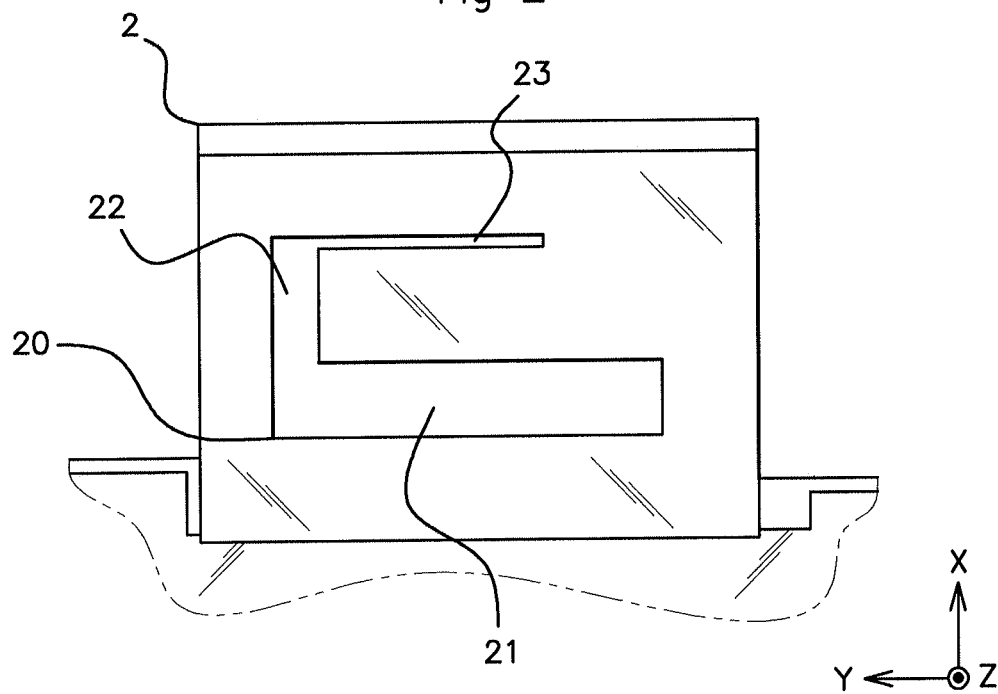
FIG. 2 shows a diagram of the second antenna part of the same embodiment, formed of a hook-shaped opening made in a lower face of the metal housing in a multimedia system.

With reference to FIG. 2, the second antenna part 20 is formed of an opening cut out in that face of the metal housing 2 which is situated opposite the first antenna part 10.

Said opening exhibits the same hook shape as the first antenna part 10, with the same dimensions. Said opening is moreover parallel to the first antenna part 10 and the hook shape corresponding to the second antenna part 20 is rotated by 90° with respect to the hook shape corresponding to the first antenna part 10, according to a rotation about the Z axis. In this instance, in accordance with the embodiment represented in FIG. 2, the second antenna part 20 therefore comprises three consecutive segments 21, 22, 23, each pair of consecutive segments being orthogonal, and said three consecutive segments 21, 22, 23 exhibiting the same length as the three consecutive segments 11, 12, 13 forming the first antenna part 10.

Thus, the association between the first antenna part 10, fed and received by the printed circuit 1, inside the metal housing 2, and the second antenna part 20, formed of an opening in the face of the metal housing 2, opposite the first antenna part 10, the first antenna part 10 and the second antenna part 20 exhibiting one and the same hook shape, and said hook shapes being situated in two separate parallel planes oriented at 90° with respect to one another, constitutes the multi-band antenna device according to an aspect of the invention.

Figure 3:
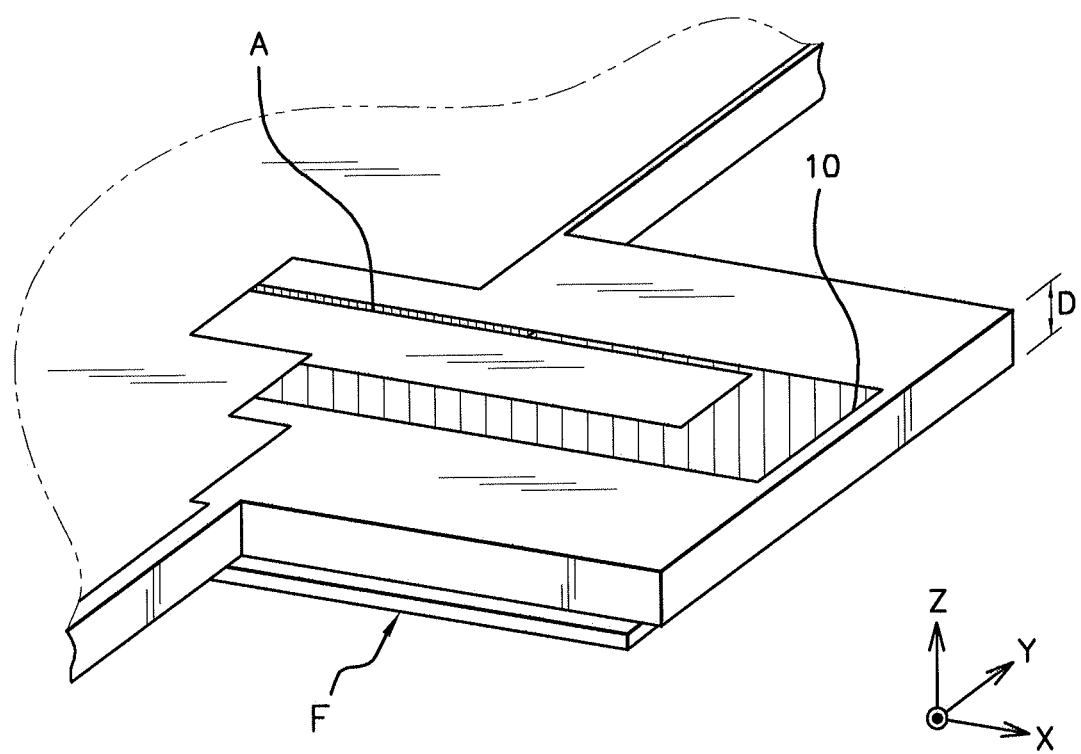
FIG. 3 represents the diagram of a metal housing of a multimedia system, according to the same embodiment, with the first and the second antenna parts.

With reference to FIG. 3, it should be noted that the distance D between the first antenna part 10 and the second antenna part 20, corresponding to the distance between the first antenna part 10 and the face F of the metal housing 2 comprising the opening constituting the second antenna part 20, is adjustable. This distance D can preferably be configured so as to optimize the matching of the antenna device.

It should be noted moreover that the face F in which the opening forming the second antenna part 20 is made is preferably a lower face of the metal housing 2, that is to say that face of the rectangular parallelepipedal housing which is situated at the bottom when the metal housing is in a position of use, that is to say typically installed in a multimedia system integrated with an automotive vehicle central console.

Figure 4:
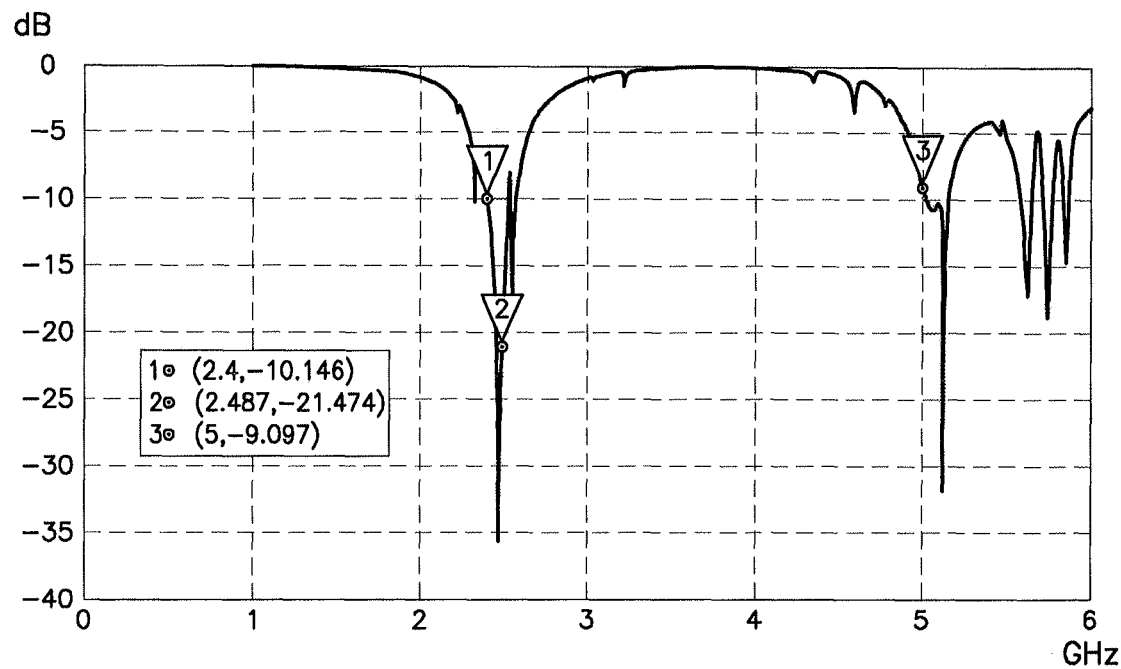
FIG. 4 presents a matching chart for a multi-band antenna device in accordance with the same embodiment, the device working in frequency bands centered respectively on 2.4 GHz and on 5 GHz.
Figure 5:
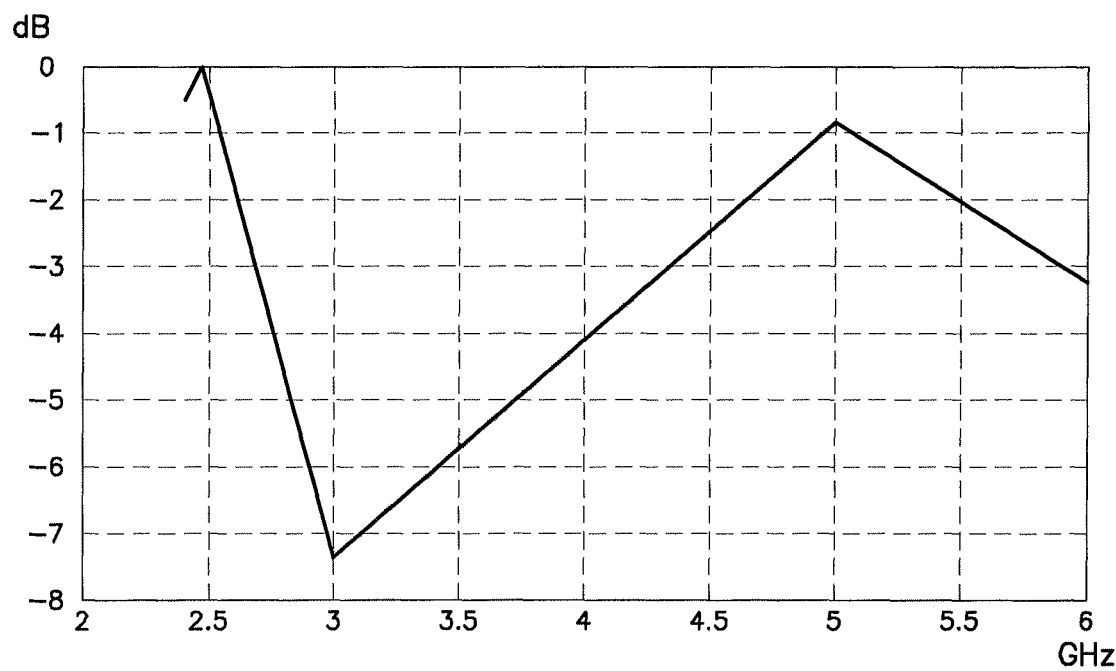
FIG. 5 presents a chart of effectiveness of a multi-band antenna device in accordance with the same embodiment.

With reference to FIGS. 4 and 5, it is shown that the multi-band antenna device according to an aspect of the invention exhibits very high performance, through the simulations performed on an embodiment in accordance with that described hereinabove, in which said antenna device works in the band 2.400 GHz-2.485 GHz and in the band 5.00 GHz-5.85 GHz.

FIG. 4 thus shows the matching of such an antenna device, designated by the term known to the person skilled in the art as parameter S11, as a function of frequency, while FIG. 5 shows the total effectiveness of the antenna device, as a function of frequency.

These charts clearly show the good performance level of the antenna device in the targeted frequency bands. It should be noted that high performance is also obtained, under simulation, from the point of view of the radiation, in all directions.

Furthermore, the performance obtained under simulation is much higher than that of a known antenna device, not comprising the second antenna part formed of an opening provided in a face of the metal housing opposite the first antenna part received by the printed circuit, the interior of the housing.

To summarize, an aspect of the present invention relates to a two-part multi-band antenna device, of which a first antenna part is formed of a hook-shaped antenna received and fed by a printed circuit inside a metal housing, and a second antenna part is formed of an opening made in a face of the metal housing, opposite the first antenna part, in a parallel plane, rotated by 90° with respect to the Z axis.

By virtue of the device according to an aspect of the invention, it is possible to integrate into a multimedia system, especially aboard an automotive vehicle, a multi-band antenna confined in a metal housing, while exploiting a part of said metal housing to optimize the performance of said antenna.

The constraining mechanical environment then exhibits a positive impact on the performance of the antenna, especially in terms of gain, matching, effectiveness and radiation.

An aspect of the present invention is in particular intended to be implemented in the automotive field, but may also be implemented in other fields.

It is clarified furthermore that aspects of the present invention are not limited to the examples described above, and is open to many variants that are accessible to those skilled in the art.

The invention claimed is:

1. A multi-band antenna device intended to be integrated into a metal housing, into a multimedia system of an automotive vehicle, comprising:
   a first, hook-shaped, antenna part linked to a feed adapted to be positioned on a printed circuit and to be situated inside the metal housing,
   a second antenna part comprising an opening made in a face of the metal housing, said opening exhibiting a hook shape identical to that of the first antenna part, with the same dimensions, and said opening being situated opposite the first antenna part, in a plane parallel to that of said first antenna part, rotated by 90° with respect to said first antenna part.

2. The multi-band antenna device as claimed in claim 1, wherein said hook shape comprises three coplanar consecutive segments, each segment of the hook shape being orthogonal to each of the contiguous segments.

3. The multi-band antenna device as claimed in claim 2, wherein the face of the metal housing comprising the opening forming the second antenna part and the printed circuit receiving the first antenna part are separated by a distance adjustable as a function of the matching obtained of the antenna device.

4. The multi-band antenna device as claimed in claim 1, wherein the face of the metal housing comprising the opening forming the second antenna part and the printed circuit receiving the first antenna part are separated by a distance adjustable as a function of the matching obtained of the antenna device.

5. The multi-band antenna device as claimed in claim 1, wherein the opening is made in a face of an underside of the metal housing in a situation of use.

6. A multi-band antenna device intended to be integrated into a metal housing, into a multimedia system of an automotive vehicle, comprising:
   a first, hook-shaped, antenna part linked to a feed adapted to be positioned on a printed circuit and to be situated inside the metal housing, and
   a second antenna part comprising an opening made in a face of the metal housing, said opening exhibiting a hook shape identical to that of the first antenna part, with the same dimensions, and said opening being situated opposite the first antenna part, in a plane parallel to that of said first antenna part, rotated by 90° with respect to said first antenna part,
   wherein the multi-band antenna device is configured to radiate in two frequency bands starting from a first frequency corresponding to a first wavelength $\lambda$ and, respectively, from a second frequency, greater than the first frequency, corresponding to a second wavelength $\lambda'$, the hook shape being formed of three segments, the lengths of said three segments and said first and second wavelengths being configured in such a way that the segments are formed of a first segment, connected to the feed, measuring $\lambda'/4$, of a second segment measuring $\lambda'/8$ and of a third segment measuring $\lambda'/6$, the sum of the lengths of the three segments being equal to $\lambda/4$.

7. The multi-band antenna device as claimed in claim 6, wherein the first frequency equals 2.4 GHz and the second frequency equals 5 GHz.

8. The multi-band antenna device as claimed in claim 7, configured to allow wireless communication in accordance with Bluetooth® protocol in the frequency band 2.400 GHz-2.485 GHz and to allow Wifi® communication in the two bands 2.400 GHz-2.485 GHz and 5.00 GHz-5.85 GHz.

9. A multimedia system for integration into an automotive vehicle central console, comprising a metal housing exhibiting an underside face situated toward the bottom once the multimedia system has been integrated into an automotive vehicle central console, said metal housing comprising a powered printed circuit, wherein the metal housing comprises a multi-band antenna device comprising:
- a first, hook-shaped, antenna part linked to a feed adapted to be positioned on a printed circuit and to be situated inside the metal housing, and
- a second antenna part comprising an opening made in a face of the metal housing, said opening exhibiting a hook shape identical to that of the first antenna part, with the same dimensions, and said opening being situated opposite the first antenna part, in a plane parallel to that of said first antenna part, rotated by 90° with respect to said first antenna part.

10. A multi-band antenna device intended to be integrated into a metal housing, into a multimedia system of an automotive vehicle, comprising:
- a first, hook-shaped, antenna part linked to a feed adapted to be positioned on a printed circuit and to be situated inside the metal housing, and
- a second antenna part comprising an opening made in a face of the metal housing, said opening exhibiting a hook shape identical to that of the first antenna part, with the same dimensions, and said opening being situated opposite the first antenna part, in a plane parallel to that of said first antenna part, rotated by 90° with respect to said first antenna part,
- wherein said hook shape comprises three coplanar consecutive segments, each segment of the hook shape being orthogonal to each of the contiguous segments, and
- wherein the multi-band antenna device is configured to radiate in two frequency bands starting from a first frequency corresponding to a first wavelength $\lambda$ and, respectively, from a second frequency, greater than the first frequency, corresponding to a second wavelength $\lambda'$, the hook shape being formed of three segments, the lengths of said three segments and said first and second wavelengths being configured in such a way that the segments are formed of a first segment, connected to the feed, measuring $\lambda'/4$, of a second segment measuring $\lambda'/8$ and of a third segment measuring $\lambda'/6$, the sum of the lengths of the three segments being equal to $\lambda/4$.

11. A multi-band antenna device intended to be integrated into a metal housing, into a multimedia system of an automotive vehicle, comprising:
- a first, hook-shaped, antenna part linked to a feed adapted to be positioned on a printed circuit and to be situated inside the metal housing, and
- a second antenna part comprising an opening made in a face of the metal housing, said opening exhibiting a hook shape identical to that of the first antenna part, with the same dimensions, and said opening being situated opposite the first antenna part, in a plane parallel to that of said first antenna part, rotated by 90° with respect to said first antenna part,
- wherein the face of the metal housing comprising the opening forming the second antenna part and the printed circuit receiving the first antenna part are separated by a distance adjustable as a function of the matching obtained of the antenna device, and
- wherein the multi-band antenna device is configured to radiate in two frequency bands starting from a first frequency corresponding to a first wavelength $\lambda$ and, respectively, from a second frequency, greater than the first frequency, corresponding to a second wavelength $\lambda'$, the hook shape being formed of three segments, the lengths of said three segments and said first and second wavelengths being configured in such a way that the segments are formed of a first segment, connected to the feed, measuring $\lambda'/4$, of a second segment measuring $\lambda'/8$ and of a third segment measuring $\lambda'/6$, the sum of the lengths of the three segments being equal to $\lambda/4$.

* * * * *